Patented Mar. 14, 1944

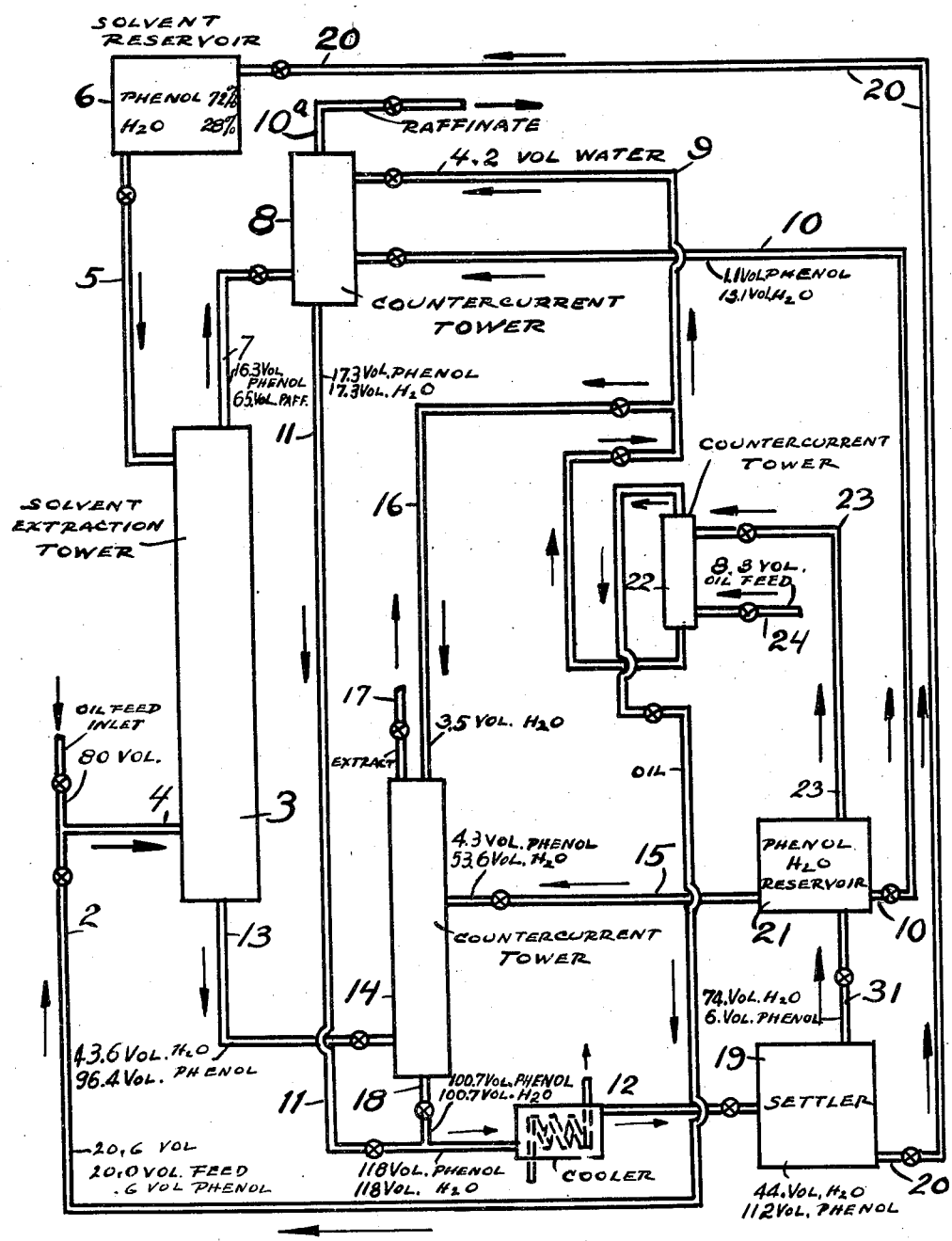

2,344,406

UNITED STATES PATENT OFFICE 2,344,406

REFINING OF MINERAL OILS

Henry J. Hibshman, Plainfield, N. J., assignor to Standard Oil Development Company, a corporation of Delaware Application July 16, 1942, Serial No. 451,119

4 Claims. (Cl. 196—13)

The present invention is concerned with the refining of mineral oils. The invention is more particularly concerned with an improved solvent treating process employing a particular arrangement and sequence of stages in conjunction with a particular solvent under conditions whereby the desired segregation of the relatively more paraffinic constituents from the relatively more aromatic type constituents may be readily and efficiently secured, and whereby the solvent used by the process employed is readily recoverable.

It is known in the art to segregate oils, particularly petroleum oils, into their relatively more paraffinic type constituents and into their relatively more aromatic type constituents, utilizing various selective solvents. The solvents usually employed are the solvents selected from the class which have a preferential selectivity for the relatively more aromatic type constituents as compared to the relatively more paraffinic type constituents. Solvents of this class are, for example, phenol, furfural, sulfur dioxide, cresol, nitrobenzene, aniline, beta, beta' dichlorodiethyl ether, and the like. Although batch or semi-batch methods of contacting the oil and solvent are employed, the conventional process comprises a countercurrent tower treating operation in which the heavier phase, usually the solvent, is continuously introduced at the top of a countercurrent treating tower, while the lighter phase comprising the oil is continuously introduced at an intermediate or lower part of the countercurrent treating tower. Temperature and pressure conditions are adjusted to secure the formation of a raffinate or highly paraffinic phase and a solvent extract or highly aromatic phase. Suitable contact between the countercurrently flowing phases is secured by suitable distributing and contacting means, such as pierced plates, packing masses, and the like.

The respective phases are separated and the solvent removed from the oil, usually by distillation means. However, operations of this character possess the disadvantage that it is relatively difficult and expensive to remove the solvent in this manner. It has, therefore, been proposed that the solvent be removed from the oil by other means, such as by treatment with a secondary solvent or by various washing operations. In particular, it has been proposed to use phenol containing small proportions of water (up to 15%) and to remove the phenol from the extract phase by washing with water and recovering the phenol by phase separation on cooling, but in these methods temperatures are employed which are only high enough to maintain the phenol in the liquid phase, and in order to recover phenol in such concentration as to be useful a further concentrating step must be employed.

I have, however, now discovered an improved process which may be readily adapted in the processing of mineral oils, particularly lubricating oil fractions, which comprises using a particular solvent consisting of phenol and water, the latter comprising about 26% to about 30% by volume of the mixture, which solvent is used in a particular arrangement and sequence of stages and under special conditions of temperature, whereby improved, unforeseeable, desirable results are secured. By this process the extraction is conducted at a quite high temperature, namely, from about 300° F. to about 450° F., and a pressure is maintained which is sufficient to hold the materials present in liquid phase. By this means an extract phase is obtained which may be washed with water to remove the phenol from the oil, preferably at a temperature slightly above the critical solution temperature of phenol and water, and the separated phenol and water may then be cooled to ordinary atmospheric temperatures, e. g., about 50° F., whereby a phase separation occurs, and the more phenolic phase may then be returned without further treatment for use in the original extraction zone. For this purpose an amount of water or weak aqueous phenol solution should be used for washing the extract which will produce, after separation from the oil, a phenol-water mixture containing 40% to 60% by volume of water, preferably about equal proportions of water and phenol. At the same time the more aqueous phase may be conveniently employed for washing the phenol from the original extract portion of the oil. If substantially less than 26% of water is present in the extracting solvent, the phenol recovered by washing from the extract phase will require further concentration, or the phenol-water mixture would have to be artificially cooled to a quite low temperature to effect a separation of a phenolic phase of sufficient phenol concentration. A concentration of water in the solvent greater than 30% will generally be impractical, since excessively high temperatures of operation will be required.

The process of my invention may be readily understood by reference to the attached drawing illustrating in schematic form one embodiment of the same. For the purpose of illustration it is assumed that the feed oil comprises a petroleum oil boiling in the lubricating oil boiling range. In this embodiment the process is continuous and the volumes of the various feed stocks and treating agents are relative volumes and thus represent the actual volumes introduced or withdrawn in a unit of time.

Referring specifically to the drawing, 80 volumes of fresh feed oil are introduced into the system by means of feed line 1. This oil is combined with 20.6 volumes of additional feed, which is introduced by means of line 2, consisting of 20 volumes of feed oil and 0.6 volume of phenol, which is secured as hereinafter described. The total feed mixture, consisting of 100 volumes of fresh feed oil and 0.6 volume of phenol, is introduced into the lower section of countercurrent extraction tower 3 by means of line 4. The feed flows upwardly through extraction tower 3 and countercurrently contacts downflowing solvent which is introduced into the upper section of tower 3 by means of line 5. The solvent consists of 72% by volume of phenol and 28% by volume of water and is withdrawn from solvent storage zone 6. Approximately 112.1 volumes of phenol and 43.6 volumes of water are thus introduced into extraction tower 3 by means of line 5. The temperature maintained within extraction tower 3 is in the range from about 300° F. to about 450° F., while the pressure is in the range from about 100 pounds to about 500 pounds per square inch. Under the conditions of the operation of raffinate phase of about 81 volumes, consisting of 16.3 volumes of phenol along with a small amount of water and about 65 volumes of raffinate oil, is removed overhead by means of line 7. The raffinate phase is introduced into a secondary countercurrent treating zone 8 maintained at atmospheric pressure and at a temperature of about 160° F. In zone 8 the raffinate phase removed from zone 3 is countercurrently extracted with 4.2 volumes of water, which is introduced into zone 8 by means of line 9, and with 14.2 volumes of water and phenol consisting of 13.1 volumes of water and 1.1 volumes of phenol, which is introduced into zone 8 by means of line 10 and is obtained as hereinafter described. Under these conditions, 65 volumes of raffinate oil are removed from zone 8 by means of line 10a. The secondary solvent extract consisting of 17.3 volumes of phenol and 17.3 volumes of water is removed from zone 8 by means of line 11 and passed to cooling zone 12 and handled as hereinafter described.

The solvent extract removed from extraction tower 3 by means of line 13 consists of 35 volumes of extract oil, 43.6 volumes of water, and 96.4 volumes of phenol. This extract phase is introduced into a tertiary countercurrent treating zone 14 wherein it is countercurrently extracted, under atmospheric pressure, with a water phase consisting of 53.6 volumes of water and 4.3 volumes of phenol which is introduced into the middle portion of zone 14 by means of line 15 and is obtained as hereinafter described. It is also countercurrently extracted in the upper portion of the same zone with 3.5 volumes of water which is introduced into the top section of zone 14 by means of line 16. The temperature within countercurrent treating tower 14 is maintained at approximately 160° F., which is slightly above the critical solution temperature of phenol and water. Under the conditions of operation, 35 volumes of extract oil are removed from extraction zone 14 by means of line 17. The solvent, consisting of 100.7 volumes of phenol and 100.7 volumes of water, is removed from countercurrent tower 14 by means of line 18, combined with the stream removed from zone 8 by means of line 11, and passed to cooling zone 12, which is maintained at a temperature of about 50° F. The combined streams from cooler 12 are introduced into settling zone 19 wherein the temperature is maintained at about 50° F., and wherein a phase separation occurs. The lower phase, consisting of 44 volumes of water and 112 volumes of phenol, is removed from zone 19 by means of line 20 and returned to solvent reservoir 6. The upper phase, consisting of 74 volumes of water and 6 volumes of phenol, is passed to phenol water reservoir 21 from which a portion of the same is recycled to countercurrent tower 14 by means of line 15. Another portion of the same is recycled to zone 8 by means of line 10 as hereinbefore described. The remainder, consisting of 8.3 volumes, is passed to a fourth countercurrent treating zone 22 maintained at a temperature of 160° F., by means of line 23, and there contacted with 20 volumes of fresh feed, introduced by means of line 24, which feed is recycled to solvent extraction tower 3 along with the 80 volumes of additional fresh feed as hereinbefore described. The bottoms removed from zone 22 by means of line 25, consisting of substantially pure water, are segregated into two streams, one of which (3.5 volumes) is recycled to zone 14 by means of line 16, while the remainder (4.2 volumes) is passed to zone 8 by means of line 9. Although it is desirable to conduct the washing of the extract portion in tower 14 at a temperature above the critical solution temperature of phenol and water, such a temperature is not necessary for the successful operation of the process, since the water and phenol may be removed from the tower as a mixture of two phases. In any case the mixture or the single phase solution of water and phenol should be cooled to ordinary temperatures to insure the formation of a phenolic phase containing approximately 28% of water.

Although the above described process is particularly suitable for the treatment of lubricating oil fractions, especially those of an aromatic type, the process may be applied to the treatment of other petroleum fractions for the separation of the more aromatic constituents from the more paraffinic constituents and somewhat different ranges of operation temperature and composition of the phenol-water extraction solvent would be required. In these cases, however, the same principle is involved, according to which a sufficiently high temperature is used to permit employing a phenol solution of sufficiently high water content to permit recovery of the phenol at the desired strength by simple cooling to ordinary temperatures to effect phase separation, after washing the solvent from the extract portion by means of water or a weak aqueous phenol solution.

Although the above described embodiment of the invention involves a step of washing the raffinate portion with water and a weak phenol solution, the invention applies equally to cases where this step is omitted, and the raffinate is separated from the solvent by other means. It is also within the scope of the invention to include the enrichment of the phenol-water solvent from an outside source when required. Also, fresh water may be introduced into the system at any point, if desired.

Although the method of the present invention is particularly suited to a continuously operating system, the principles thereof may likewise be applied to batch or semi-batch processes. Thus, the phenol rich phase, after separation from the aqueous phase, may be stored for use as required in batch operations.

The invention is not to be considered limited by any of the specific embodiments described herein or by any specific examples of the conditions employed, but is to be limited solely by the terms of the appended claims.

I claim:

1. A method of refining a petroleum lubricating oil fraction which comprises extracting the same with a mixture comprising about 70% to about 74% by volume of phenol and about 26% to about 30% by volume of water at a temperature of about 300° to about 450° F. and under a pressure sufficient to maintain the contacting materials in the liquid phase, washing the extract thus formed with sufficient water containing not more than small amounts of phenol to produce, after separation of the oil therefrom, a mixture of phenol and water containing about 40% to about 60% by volume of water, cooling to ordinary temperatures to cause separation of phases, and returning the predominantly phenolic phase to the original extraction zone.

2. A method of refining a petroleum lubricating oil fraction which comprises extracting the same with a mixture comprising about 70% to about 74% by volume of phenol and about 26% to about 30% by volume of water at a temperature of about 300° to about 450° F. and under a pressure sufficient to maintain the contacting materials in the liquid phase, washing the raffinate phase thus produced in a first washing zone with a sufficient amount of water containing not more than small quantities of phenol to form a mixture containing approximately equal proportions of phenol and water by volume, washing the extract portion obtained from the original extraction zone in a second washing zone with sufficient water containing not more than small amounts of phenol to produce, after separation of the oil therefrom, a mixture of approximately equal portions by volume of phenol and water, combining such mixture of phenol and water with the mixture of phenol and water withdrawn from the said first washing zone, cooling the combined water-phenol mixture to ordinary atmospheric temperature to cause separation of the phases, returning the predominantly phenolic phase to the original extraction zone and returning a portion of the predominantly aqueous phase to the said first washing zone and a second portion of the predominantly aqueous phase to the said second washing zone.

3. A method of refining a petroleum lubricating oil fraction which comprises extracting the same with a mixture comprising about 70% to about 74% by volume of phenol and about 26% to about 30% by volume of water at a temperature of about 300° to about 450° F. and under a pressure sufficient to maintain the contacting materials in the liquid phase, washing the raffinate phase thus obtained in a first washing zone with a sufficient amount of water and phenol to produce a phenol-water phase containing approximately equal proportions by volume of phenol and water, washing the extract phase from the original extraction zone in a second washing zone at a temperature above the critical solution temperature of water and phenol with a sufficient amount of water and phenol to produce a phenol-water phase containing approximately equal proportions by volume of water and phenol, combining the water-phenol phases from the said first washing zone and said second washing zone, cooling the combined phenol-water phases to ordinary temperature, allowing the cooled mixture to settle to separate the more phenolic phase from the more aqueous phase, returning the more phenolic phase thus formed to the original extraction zone, returning portions of the more aqueous phase to the said first washing zone and to the said second washing zone and treating a portion of the original lubricating oil feed stock with a third portion of the said more aqueous phase to remove the phenol from said aqueous phase, and returning one portion of the substantially pure water thus obtained to the said first washing zone and a second portion of such substantially pure water to the said second washing zone.

4. A continuous method of refining a petroleum lubricating oil fraction which comprises continuously feeding, in unit time, 100 volumes of lubricating oil stock admixed with not more than about 0.6 volume of phenol into the lower portion of a countercurrent solvent extraction tower maintained at a temperature of about 300° to about 450° F. and at a pressure of about 100 pounds to about 600 pounds per square inch, continuously introducing into the upper portion of said tower, in unit time, about 155.7 volumes of a solvent comprising about 72% by volume of phenol and about 28% by volume of water, removing the raffinate phase (about 81 volumes) thus produced from the top of said tower to the lower portion of a first countercurrent washing tower maintained at about 160° F., simultaneously introducing into the middle portion of said first washing tower about 14.2 volumes of a mixture containing about 1.1 volumes of phenol and about 13.1 volumes of water, simultaneously introducing into the top portion of said first tower about 4.2 volumes of water, removing the purified raffinate (about 65 volumes) from the top of the said washing tower, removing the extract phase from said solvent extraction tower (about 175 volumes) to the lower portion of a second countercurrent washing tower maintained at a temperature of about 160° F., introducing into the middle portion of the second washing tower a mixture of about 4.3 volumes of phenol and about 53.6 volumes of water, simultaneously introducing about 3.5 volumes of water into the top of said second washing tower, removing the purified extract portion of the oil (about 35 volumes) from the top of said second washing tower, removing from said first washing tower a mixture consisting of about 17.3 volumes of phenol and about 17.3 volumes of water, removing from said second washing tower a mixture consisting of about 100.7 volumes of phenol and about 100.7 volumes of water, combining the said mixtures from the said first and second washing towers, cooling the combined mixtures to a temperature of about 50° F., allowing the cooled mixture to settle to permit separation of phases, returning the more phenolic phase (about 156 volumes) for use in the said solvent extraction tower, separating the predominately aqueous phase (about 80 volumes) into three portions, one of said portions (about 14.2 volumes) being returned to the said first washing tower, a second portion (about 57.9 volumes) being returned to the said second washing tower and a third portion (about 8.3 volumes) being used to contact about 20 volumes of lubricating oil feed stock in a countercurrent tower, whereby substantially all of the phenol (about 0.6 volume) is removed, passsing about 4.2 volumes of the thus purified water to the said first washing tower and the remaining portion (about 7.7 volumes) of the water to the said second washing tower, and passing the said 20 volumes of feed stock with about 0.6 volume of phenol, together with aditional fresh feed stock, to the said solvent extraction tower.

HENRY J. HIBSHMAN.